Oct. 3, 1933.  E. H. BELING  1,928,681
SPEED ADJUSTING DEVICE FOR POLYPHASE MOTORS
Filed Dec. 14, 1929
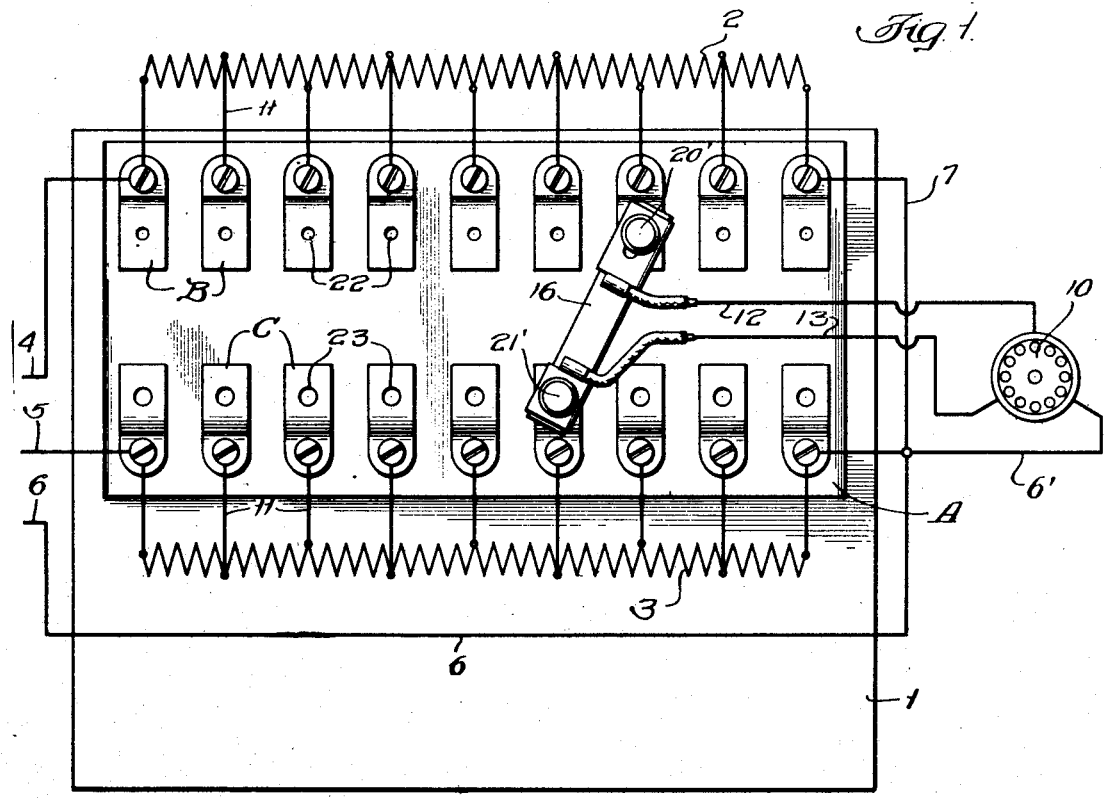
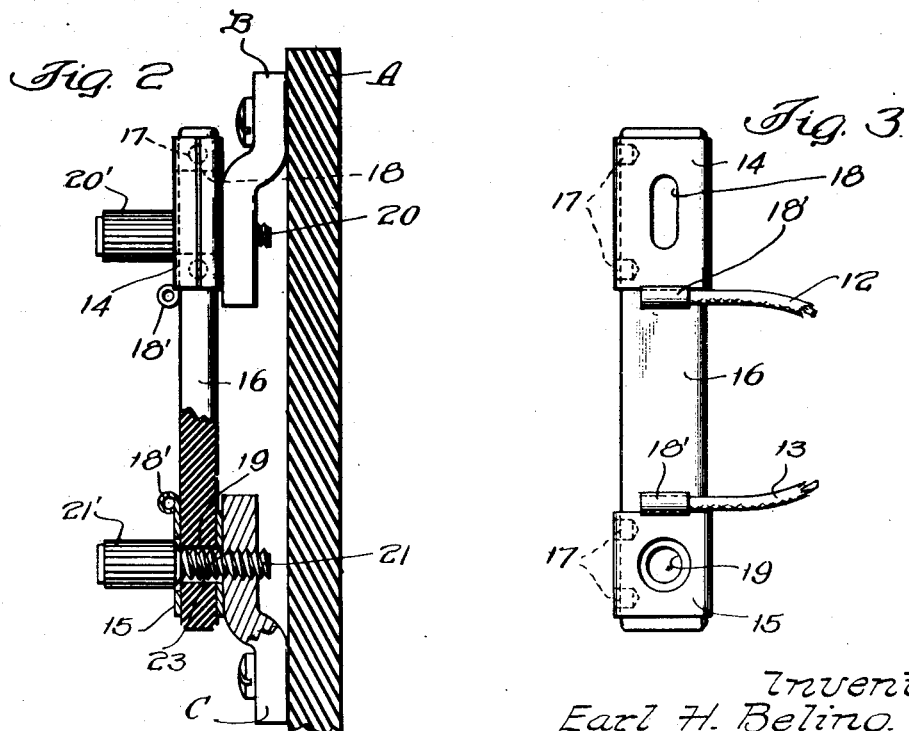
Witness
William P. Kilroy
Inventor
Earl H. Beling
By George I. Haight
Atty.

Patented Oct. 3, 1933

1,928,681

UNITED STATES PATENT OFFICE 1,928,681

SPEED ADJUSTING DEVICE FOR POLYPHASE MOTORS

Earl H. Beling, Moline, Ill., assignor to The Herman Nelson Corporation, Moline, Ill., a corporation of Illinois Application December 14, 1929
Serial No. 413,959

9 Claims. ((Cl. 171—119))

In connection with the speed adjustment of small three-phase induction motors, it is the usual practice to unbalance the system by varying the voltage in two of the phases relatively to the third phase. This is accomplished by connecting one phase of the power line directly to the motor, and interposing two auto-transformers in the other two phases between the source of power and the motor, a series of tap contact terminals being provided for each transformer, from which taps the corresponding phase connections are made to the motor. The transformer windings are connected to two of the phases of the power line, and the voltage tap terminals are arranged in rows on a suitable supporting panel, the tap terminals of one transformer having their counterparts in the corresponding tap terminals of the other transformer. The voltage in the two phases is varied relatively to the third phase by connecting the two motor leads to the corresponding taps of the transformers, the degree of voltage variation depending on which two corresponding taps the respective motor leads are connected to. The range of speed adjustment can be increased by relatively unbalancing the two adjustable phases, this being accomplished by connecting one of the adjustable motor leads to a tap terminal representing a higher or lower voltage than that to which the other adjustable motor lead is connected.

The objection to the foregoing structure is that, since the adjustable phase motor leads have ordinary unrelated terminal contacts, the motor terminals may be indiscriminately connected to the transformer tap terminals, the number of possible connection combinations being limited only by the number of transformer taps provided. Because of this condtion, the relative voltages in the adjustable phases may be unduly varied, the motor lead terminals might even be reversely connected to the transformer taps, or both motor lead terminals might be connected to taps on the same transformer, with the result that the motor or transformer windings, or both, will overheat and burn out, or the motor might be reversed in its rotation.

The object of my invention is to overcome the foregoing objection and prevent damage to the motor or transformer by making impossible the indiscriminate or incorrect connection, accidentally or otherwise, of the motor lead terminals to the transformer taps.

Another object of my invention is to provide an improved means for properly adjusting the motor and transformer connections to vary the motor speed in accordance with prescribed or normal operating conditions of the motor.

Other objects of the invention will appear hereinafter.

Referring to the accompanying drawing:

Fig. 1 is a view in elevation of a transformer panel and adjustable terminal device, embodying the invention, the transformer windings and circuit connections being shown in diagram;

Fig. 2 is an enlarged view, partly in section, showing the adjustable terminal device mounted on the transformer tap terminals; and Fig. 3 is a face view of the adjustable terminal device.

In the drawing, a transformer panel A is illustrated as having two parallel rows or series of tap terminals B and C, forming contacts to which the motor terminals are detachably connected. This panel may be of any suitable or accepted construction for the purpose, and usually comprises a flat plate of insulating material mounted on a suitable support or frame 1. These tap contacts are illustrated as comprising metal lug members permanently mounted on the face of the insulating panel A by means of screws or otherwise. In the present structure, the tap contacts are equally spaced apart and the contacts of the two rows are arranged in parallel across the panel, with the corresponding contacts in each row in substantially vertical alignment.

The auto-transformers 2 and 3 are illustrated diagrammatically. The windings of these transformers are arranged in delta connection in the system, so that the winding of each transformer is included in one phase of the source of polyphase alternating current represented by the conductors 4, 5 and 6. One end of each of these windings is connected to the phase conductors 4 and 5, and the other ends of the windings are connected together by the common conductor 7 in delta relation. The third phase 6 of the source of power is connected by the conductor 6' directly to the motor 10, the speed of which is to be adjusted. The motor is diagrammatically illustrated as of the induction type. The voltage taps 11 are taken from the windings of the transformers at intervals and terminate in the respective top contacts B and C on the panel, so that when the conductors 12 and 13, leading from the motor and representing the other two phases of the motor connections, are connected to these tap contacts B and C, the voltage is varied in these two phases relatively to the third phase 6 and the speed of the motor is correspondingly adjusted.

In order to prevent the indiscriminate connection of the two phases 12 and 13 of the motor to the transformer taps, I provide terminals 14 and 15 for the motor leads 12 and 13, which terminals are mounted on a common supporting member 16, so that when the terminals are to be connected to the transformer taps they must be handled both at the same time by the common mounting 16. This common mounting 16 is preferably in the form of a flat bar of fibre or other suitable insulating material, which electrically separates the two terminals 14 and 15. The terminals 14 and 15 are preferably formed as sleeves surrounding the end portions of the insulating bar and secured thereto by suitable screw members 17. Each terminal has an integral tubular transversely disposed sleeve 18', into which one of the motor leads 12 and 13 is inserted and soldered or otherwise fastened.

These terminals have holes 18 and 19 through which the screws 20 and 21 may be inserted and screwed into threaded holes 22 and 23 in the transformer tap contacts to connect the motor lead terminals to the transformer contacts. A separate screw member is provided for fastening each of the terminals 14 and 15 to their respective transformer tap contacts, and the holes 22 and 23 in the transformer contacts are of a different diameter and thread for each row. This makes it impossible to interchange the screws 20 and 21 in the threaded holes 22 and 23. In like manner, the holes 18 and 19 of the motor lead terminals are of different size, corresponding to the different sizes of the screws and the threaded holes in the transformer tap contacts. Consequently, the motor terminals 14 and 15 cannot be reversely or interchangeably fastened to the transformer taps. This is obvious because if an attempt were made to connect the motor terminal 14, for instance, to one of the transformer contacts C, the screw member 21 could not be inserted through the hole 18 in said motor terminal. It is apparent, then, that the motor terminal 14 must always be connected to one of the tap contacts B of the transformer 2, and by the same token the motor terminal 15 must always be attached to one of the contacts C of the transformer 3. It becomes impossible, therefore, to accidentally or intentionally reverse the direction of rotation of the motor.

It is the usual practice to vary the speed of the motor by varying the voltage equally in the two adjustable phases of the system, and this equal variation of voltage in the two auto-transformers is accomplished by connecting the motor terminals to corresponding transformer contacts B and C, which in the present case are vertically aligned with respect to each other. Therefore, the length of the terminal device and the distance between the holes 18 and 19 corresponds to the distance between any two vertically aligned contacts B and C. It is practical, however, in order to increase the range of speed adjustments, to vary the voltage in the two adjustable phases slightly relatively to each other, to the extent, for instance, respresented by a tap contact in one series immediately to the right or left of a given contact in the other series. This is accomplished with my terminal device by connecting the one end to a contact in one row and the other end to a contact to the right or left thereof in the other row, as illustrated by the position of the terminal device in Fig. 1. For this purpose, the length of the terminal device is made just sufficient to extend between one of the contacts in one of the series and the next contact to the right or left thereof in the other series. It is not sufficiently long, however, to extend to the second contact to the right or left. It is obvious, therefore, that the voltage variation between the two adjustable phases of the system cannot be greater than that represented by the next tap contact to the right or left of a given contact in the other series. One of the holes, preferably the hole 18 in the terminal 14, is elongated sufficiently to allow for this limited positioning of the terminal device with respect to the contacts in the two series. The screw members 20 and 21 may be provided with knobs 20' and 21' of insulating material by which they may be conveniently manipulated.

In order that the operator may be relieved of any necessity of experimenting to determine the proper position of the motor terminal device, I prefer to use contrasting colors on the faces of the respective parts which correspond. For instance, the upper portion of the transformer panel, including the tap terminals, may be colored green, and the lower portion red. Further, the corresponding end of the terminal device, including the screw head may be colored green, and the other end red. This enables the operator to see at a glance the proper relation of the parts.

The structure which I have provided is extremely simple and inexpensive to manufacture. It is, however, completely effective in preventing wrong connections from being made and in compelling the operator to make only those connections which are consistent with the proper operation of the motor. Although both motor terminals are handled as a unit, none of the parts are interchangeable with respect to the transformer contacts, except the permissible shifting of one end of the terminal device a distance of one contact either to the right or left of a given contact of the other series.

I am aware that changes may be made in the construction, operation and arrangement of the parts, without departing from the spirit of the invention, and I desire it to be understood that I am entitled to make all such changes as fairly fall within the scope of the appended claims.

I claim:

1. The combination of a plurality of transformers, a supporting panel, a plurality of parallel rows of contacts mounted thereon and connected to said transformers, a terminal bridge member adapted to be extended across from one row of contacts to another row, means at one end of said member individual to the contacts of one row for connecting said member to a contact in said row, and means at the other end of said member and individual to the contacts of the other row for connecting said latter end of the member to said other row.

2. The combination of a source of polyphase alternating current, auto-transformers in two of the phases, a plurality of tap contacts for each of said transformers, detachable terminals adapted to be connected to said transformer tap contacts in predetermined relation thereto, a common support for said terminals, and means associated with said tap contacts and terminals for rendering said terminals incapable of connection to said tap contacts except in said predetermined relation.

3. The combination of a source of polyphase alternating current, auto-transformers in two of the phases, a plurality of tap contacts for each of said transformers, detachable terminals adapted to be connected to said transformer tap contacts in predetermined relation thereto, a common support for said terminals, detachable means for fastening the terminals to said tap contacts in said predetermined relation, and means for rendering said terminals incapable of connection to said tap contacts except in said predetermined relation.

4. In a structure of the class described, the combination of two transformers connected to a source of polyphase alternating current, a plurality of tap contacts for each transformer, the contacts of said transformers being arranged in parallel rows spaced apart, two independent terminals adapted for connection to said transformer tap contacts, a supporting member adapted to hold said terminals in a definite relation to each other and to position said terminals for connection to a predetermined tap contact in each row, and a fastening device individual to the contacts of each row and to the terminal tap connected to the contacts of said row, said individual fastening devices being different for each row of contacts to prevent interchange of the terminals with respect to the contacts of the rows.

5. In a structure of the class described, the combination of two transformers connected to a source of polyphase alternating current, a plurality of tap contacts for each transformer, the contacts of said transformers being arranged in parallel rows spaced apart, two independent terminals adapted for connection to said transformer tap contacts, a supporting member adapted to hold said terminals in a definite relation to each other and to position said terminals for connection to a predeterminad tap contact in each row, a screw individual to each row of contacts for fastening the respective terminal to said contact, said individual screws being of different size for the two rows, and means associated with said terminals for rendering terminals capable of being fastened by said screws in reverse relation to the rows of contacts.

6. In a speed adjusting device of the class described, the combination of a supporting panel, two rows of contacts mounted on said panel in parallel relation, a transformer for each row of contacts having tap connections to the contacts in its row, an insulating bridge member adapted to extend from a given contact in one row to a predetermined contact in the other row, a pair of terminals carried by said insulating member for connection to said given contact in one row and said predetermined contact in the other row, and a screw of a different size to each row for fastening the respective terminals to the contacts of said rows.

7. In a polyphase motor speed adjusting device of the class described, the combination of a plurality of transformers, a supporting panel having rows of contacts mounted thereon, the contacts of each row being connected to a transformer and having threaded openings of different size than the contacts of the other row, a detachable terminal adapted to be fastened to a contact in each row, a screw member corresponding in size to the threaded openings in each row for fastening the respective terminal to its contact in that row, and a common insulating support for said detachable terminals.

8. In a non-reversible speed adjusting device of the class described, the combination of a pair of transformers, each having a plurality of parallel tap contacts to give a wide range of voltages for each of said transformers, terminals adapted to be connected to said transformer tap contacts only in a restricted safe range of unbalance to multiply the available speeds, and means associated with said tap contacts and terminals for rendering said terminals incapable of connection to said tap contacts of the other transformer interchangeably.

9. The combination of a source of polyphase alternating current, transformers in two of the phases, a plurality of tap contacts for each of said transformers, detachable terminals adapted to be connected to said transformer tap contacts in predetermined relation thereto, a common support for said terminals, and means associated with said tap contacts and terminals for rendering said terminals replaceable by visible color identification and incapable of connection to said tap contacts except in said predetermined relation.

EARL H. BELING.